US011958729B2

(12) United States Patent
Wuertenberger (10) Patent No.: US 11,958,729 B2
(45) Date of Patent: Apr. 16, 2024

(54) ATTACHMENT AND HANDLING DEVICE WITH AN ATTACHMENT

(71) Applicant: Schwamborn Geraetebau GmbH, Wangen (DE)

(72) Inventor: Christoph Wuertenberger, Wangen (DE)

(73) Assignee: Schwamborn Geraetebau GmbH, Wangen (DE)

( * ) Notice: Subject to any disclaimer, the term of this patent is extended or adjusted under 35 U.S.C. 154(b) by 1003 days.

(21) Appl. No.: 16/877,635

(22) Filed: May 19, 2020

(65) Prior Publication Data

US 2020/0277171 A1    Sep. 3, 2020

Related U.S. Application Data

(63) Continuation of application No. PCT/EP2018/081805, filed on Nov. 19, 2018.

(30) Foreign Application Priority Data

Nov. 20, 2017    (DE) ...................... 10 2017 127 339.5

(51) Int. Cl.
*B66F 9/06*    (2006.01)
*B24B 7/18*    (2006.01)
(Continued)

(52) U.S. Cl.
CPC ............... *B66F 9/06* (2013.01); *B24B 7/182* (2013.01); *B24B 27/0007* (2013.01);
(Continued)

(58) Field of Classification Search
CPC ......... B24B 7/182; B24B 7/184; B24B 7/186; B24B 7/222; B24B 23/02; B24B 41/007;
(Continued)

(56) References Cited

U.S. PATENT DOCUMENTS 5,637,032 A    6/1997 Thysell et al.
6,189,473 B1    2/2001 Appel et al.
(Continued)

FOREIGN PATENT DOCUMENTS

CN        107336098 A    11/2017
DE    102006056179 A1    6/2008
(Continued)

OTHER PUBLICATIONS

Machine translation of FR-2725932-A1 (Year: 1996).*
(Continued)

*Primary Examiner* — Joel D Crandall
*Assistant Examiner* — Robert F Neibaur
(74) *Attorney, Agent, or Firm* — Jason H. Vick; Sheridan Ross, PC (57) ABSTRACT

An attachment for a mobile handling device is configured for processing walls or ceilings. The attachment comprises a mounting unit that is arranged to be supported at a mounting interface of the handling device, a processing head that is arranged to be equipped with at least one tool for material-removing processing or smoothing processing, and a compensation arrangement that is arranged between the mounting unit and the processing head and that defines a longitudinal axis. The mounting unit provides at least two pivot positions for the attachment that are offset from one another. The processing head is movable relative to the mounting unit in a longitudinal direction along the longitudinal axis. The compensation arrangement is configured to provide a defined contact pressure force for the processing head in a defined operating range along the longitudinal axis towards the surface to be processed.

10 Claims, 6 Drawing Sheets

(51) Int. Cl.
  *B24B 27/00* (2006.01)
  *B24B 41/00* (2006.01)
  *B24B 49/08* (2006.01)
  *B24B 49/16* (2006.01)

(52) U.S. Cl.
  CPC ............ *B24B 41/007* (2013.01); *B24B 49/08* (2013.01); *B24B 49/16* (2013.01)

(58) Field of Classification Search
  CPC . B24B 41/047; B24B 41/10–14; B24B 49/08; B24B 49/16; B24B 55/10; B24B 55/102; B24B 55/02; B24B 55/06; B25J 11/0065; B66F 9/06; A47L 11/38
  USPC ....... 451/5, 11, 24, 294, 295, 353, 354, 434, 451/446, 449, 453, 456
  See application file for complete search history.

(56) References Cited

U.S. PATENT DOCUMENTS

| | | | |
|---|---|---|---|
| 7,074,111 B2* | 7/2006 | Cecil | B24B 49/16 451/24 |
| 1,176,262 A1 | 3/2016 | Zoboli et al. | |
| 9,505,099 B2 | 11/2016 | Richardson | |
| 9,908,763 B2* | 3/2018 | Bagge | B66F 9/0655 |
| 10,414,011 B2 | 9/2019 | Richardson | |
| 10,618,174 B2* | 4/2020 | Augenbraun | B25J 13/081 |
| 2005/0064804 A1 | 3/2005 | Cecil et al. | |
| 2008/0132155 A1 | 6/2008 | Thysell | |
| 2015/0290761 A1 | 10/2015 | Richardson | |

FOREIGN PATENT DOCUMENTS

| | | | | |
|---|---|---|---|---|
| DE | 102012020303 A1 | 5/2013 | | |
| EP | 2035193 B1 | 11/2010 | | |
| EP | 2508680 A1 | 10/2012 | | |
| EP | 2960014 A2 * | 12/2015 | ......... | B24B 27/0007 |
| EP | 2960014 A2 | 12/2015 | | |
| EP | 2695707 B1 | 3/2016 | | |
| FR | 2725932 A1 * | 4/1996 | ............... | B28D 1/18 |
| FR | 2725932 A1 | 4/1996 | | |
| RU | 2275297 C1 | 4/2006 | | |
| RU | 68413 U1 | 11/2007 | | |
| RU | 170716 U1 | 5/2017 | | |
| WO | WO 92/08752 | 5/1992 | | |
| WO | WO 94/08752 | 4/1994 | | |
| WO | WO 2007/141320 | 12/2007 | | |

OTHER PUBLICATIONS

Machine translation of EP-2960014-A2 (Year: 2015).*
International Search Report for International Application No. PCT/EP2018/081805, dated Mar. 21, 2019.
Written Opinion for International Application No. PCT/EP2018/081805, dated Mar. 21, 2019.
Office Action for German Patent Application No. 10 2017 127 339.5, dated Sep. 6, 2018.
Translation of Office Action for corresponding Russian Application No. 2020116079/05(026263), dated Mar. 3, 2021.
International Preliminary Report on Patentability for International Application No. PCT/EP2018/081805, dated Jun. 4, 2020.

* cited by examiner

ATTACHMENT AND HANDLING DEVICE WITH AN ATTACHMENT

CROSS-REFERENCES TO RELATED APPLICATIONS

This application is a continuation of international patent application PCT/EP2018/081805, filed on Nov. 19, 2018 and designating the U.S., which international patent application has been published in German language and claims priority to German patent application 10 2017 127 339.5, filed on Nov. 20, 2017. The entire contents of these priority applications are incorporated herein by reference.

BACKGROUND

In some embodiments, the present disclosure relates to an attachment for the processing of walls or ceilings, for instance for removing processing or smoothing processing walls or ceilings, which is arranged to be attached to a mobile handling device, such as a mobile work machine. In certain embodiments, the present disclosure relates to a handling device, such as a mobile work machine, comprising an undercarriage, a body and an extension arm, wherein such an attachment is supported on the extension arm.

An embodiment of an attachment kit is disclosed in EP 2 960 014 A2. This document discloses a grinding- and/or milling device for grinding and/or milling surfaces such as walls, ceilings and floors or the like of a building during its renovation, comprising a grinding- and/or milling head with at least one motor-driven grinding wheel and/or milling cutter for abrasive machining of the surface and/or coating of the surface, wherein the grinding- and/or milling device comprises a grinding- and/or milling head, which is arranged to be attached to a movable arm via a coupling device.

EP 2 960 014 A2 describes in an embodiment a so-called telescopic device between the grinding- and/or milling head and the coupling device. However, EP 2 960 014 A2 is not concerned with specific arrangements and details of such a telescopic device. This applies in particular to the specific operation in ceiling machining.

Devices for removing, smoothing and/or roughening within the context of the present disclosure are arranged as polishing machines, grinding machines and/or milling machines for processing flat surfaces, for example. This may include the provision of a processing head supporting one or more tools, in some embodiments. In certain embodiments, the tools are driven to cause a relative movement between the tools and the surface to be processed.

A main field of application for such machines is floor processing. Accordingly, machines for processing (grinding, polishing, cleaning, milling, etc.) concrete floors, stone floors and other substrates are known. In this context, reference is made to U.S. Pat. No. 5,637,032 A, by way of example, which describes a machine for processing stone floors.

However, the present disclosure relates to equipment that is primarily configured to process corresponding flat surfaces on walls and/or ceilings. For the purposes of the present disclosure, the term wall shall include sidewalls and ceiling walls. However, as used herein, the term wall generally does not refer to a floor or floor surface.

Efforts are being made to provide machines that are suitable for removing processing or smoothing processing walls, i.e. not floors. When processing concrete, screed, natural stones, etc., a certain contact pressure and/or a certain bearing pressure must be provided. Only then can the tool have an abrasive or smoothing effect on the corresponding material. Commercially available processing heads for floor processing machines act on the floor with a support weight of 80-300 kg, by way of example. Accordingly, with floor processing, the required contact pressure is simply provided by the machine's own weight. As the dead weight is not subject to considerable fluctuations, the contact pressure is basically constant. This is important for the quality of the processing result.

This also explains why machines that are for working floors are generally not suitable for working sidewalls or ceilings. It would then be necessary not only to bear the weight of the machine itself, but also to provide the required contact pressure without huge fluctuations.

One approach is to design the machines as attachments that can be mounted on the boom of a handling device or mobile work machine. In this context, in addition to EP 2 960 014 A2, reference is made to documents WO 2007/141320 A1, DE 10 2006 056 179 A1 and FR 2 725 932 A1, for example. An exemplary arrangement of a suitable handling device that is configured as a mobile work machine with remote control is known from EP 2 508 680 A1.

Accordingly, attachments (also referred to as attachment kits) for grinding, milling or otherwise processing walls and/or ceilings are as such known in general terms. However, it has been observed that there are in practice still drawbacks, which may result in a certain impairment of the performance and in particular the quality of the work result.

In view of this, it is an object of the present disclosure to present an attachment as well as a handling device that is equipped with such an attachment, which enable the processing of walls or ceilings and which further improve conventional designs of such machines.

It is a further object of the present disclosure to present design approaches, which may result in an increase of the removal performance and/or area performance.

It is a further object of the present disclosure to present design approaches, which may ensure a high, constant processing quality.

It is a further object of the present disclosure to present an attachment, which is arranged in such a way that the processing can be easily controlled and checked by an operator.

It is a further object of the present disclosure to present an attachment, which is arranged in such a way that universal application with various types of handling devices, work machines, tool carriers, etc. is possible.

It is a further object of the present disclosure to present an attachment, which is arranged to be as self-sufficient as possible, for instance with regard to control/regulation or, more generally, information exchange with a control device of the handling device.

It is a further object of the present disclosure to present an attachment, which is arranged in such a way that standard handling devices can be geared up for the use of the attachment without much effort.

It is a further object of the present disclosure to present a corresponding use of an attachment for working on ceilings or walls, with the goal of upgrading mobile handling devices, mobile work machines and other equipment, and to enable new fields of application for this equipment.

SUMMARY

In regard of the attachment, these and other objects are achieved by an attachment for material-removing processing or smoothing processing walls or ceilings for a mobile handling device, such as a mobile work machine, the attachment comprising:

a mounting unit that is arranged to be supported on a mounting interface of the handling device, a processing head, which is arranged to be equipped with at least one tool for material-removing processing or smoothing processing, and a compensation arrangement that is arranged between the mounting unit and the processing head and that defines a longitudinal axis, wherein the mounting unit provides at least two pivot positions for the attachment that are offset from one another, wherein the processing head is movable relative to the mounting unit in a longitudinal direction along the longitudinal axis, and wherein the compensation arrangement is configured to provide a defined contact pressure force for the processing head towards the surface to be processed in a defined operating range along the longitudinal axis.

In certain embodiments, the compensation arrangement allows for relatively easy operation during machining without overstraining the operator. It has been observed that complex controls lead to complicated operation, which is not generally accepted in practice. In certain embodiments, no control commands or other information are exchanged between the attachment and the handling device. In other words, the attachment is configured to be self-sufficient in terms of control, at least in exemplary embodiments.

Strictly seen, the operator would on the one hand have to control the handling device, which in turn would have to apply a holding force to press the attachment against the wall or ceiling with the desired pressure. It has been observed that a handling device, which also generates a feed movement of the processing head along the surface to be processed, cannot provide the desired contact pressure with the required accuracy and consistency. However, excessive pressure fluctuations would impair the machining result.

Thus, in accordance with certain embodiments, it is assumed that the handling device applies a certain holding force to support the attachment, but is not responsible for maintaining the desired accuracy of the contact force. The compensation arrangement on the attachment itself ensures that the resulting contact pressure is within a sufficiently small tolerance range. The compensation arrangement can therefore compensate for pressure fluctuations, which result from changes in location or other fluctuations in the holding force, in at least a certain operating range (distance range in relation to the working surface). In certain embodiments, operating range is sufficiently large so that in practice, with the usual deflections or movements between the processing head and the mounting interface of the handling device, there is nevertheless a contact pressure that is as constant as possible. In certain embodiments, this does not require operator intervention directly on the attachment.

This approach ensures practical and understandable operation and also allows the attachment to be arranged as self-sufficiently as possible, at least in certain embodiments. The attachment can be used with various handling devices without much effort for the conversion. Apart from a rough alignment, the operator can concentrate on the feed movement along the surface to be processed during the machining process, in certain embodiments. Only if the present travel fluctuations are greater than the operating range an intervention would be necessary, for example by reorienting the handling device.

The handling device supports the own weight of the attachment. The handling device operates as a "rigid" bearing for the attachment in order to absorb the corresponding counterforces, if possible. A "play" in the kinematic chain of the handling device or, in general, a "yielding" of the handling device, may be compensated by the compensation arrangement.

In certain embodiments, the mounting unit provides at least one position for processing the ceiling and another position for processing (side) walls. It goes without saying that more than two positions can be provided, for example to enable right-handed walls and left-handed walls to be processed without moving the handling device. In addition, positions can be provided for the machining of slopes.

In certain embodiments, the processing head is equipped with a drive or coupled with a drive. The drive can be an electric motor drive or a fluid drive (hydraulic or pneumatic). The energy for the drive can be supplied to the attachment via the handling device. In principle, combustion-engine drives are also conceivable.

In certain embodiments, the attachment is suitable for working on concrete, natural stone, rendering, plaster, etc. The attachment can be equipped with tools for grinding, milling, polishing, bush hammering and/or cleaning. Bush hammering or the bush hammering technique is a method of roughening surfaces. In this way a defined profiling of the surface is created.

In certain embodiments, the attachment can be activated with only one switch. If such a switch activates both the compensation arrangement and the processing head, no further direct control intervention by the operator on the attachment is required before or during processing. If an actual machining mode (wall or ceiling and horizontal or vertical, respectively) and a target speed of at least one tool on the processing head are known, a simple activation via an ON/OFF switch is sufficient. The position control is then performed via the handling device without direct control intervention on the attachment. This allows the operator to position the attachment with the processing head at a certain distance from a wall (or ceiling), for instance. After activating the activation switch, the processing head is driven, and the compensation device is activated, which then presses the processing head against the wall (or ceiling) with the desired contact pressure. This simplifies the operation considerably, at least in certain embodiments. In certain embodiments, a few switches are required on the attachment, for instance only two switches or even only one switch.

In certain embodiments, the defined operating range is a predefined path area along the longitudinal axis. The longitudinal axis defines a local longitudinal direction of the attachment. During machining, the longitudinal axis is perpendicular to the machined surface so that the operating range describes a distance to or distance range with respect to this surface.

In certain embodiments, the handling device is, for example, a mobile work machine with a plurality of movement axes and with open kinematics, at the end of which the attachment is mounted. The kinematics may involve, for example, a plurality of arms that can be swiveled with respect to each other. For the purposes of the present disclosure, that portion or part, which is closer to the surface to be processed is called the distal portion or distal part. That portion or part, which is further away from the surface to be processed is called proximal portion or proximal part. In the following, the terms proximal and distal are used to illustrate and distinguish corresponding sections or end portions of parts and assemblies. For the purposes of the above definition, the attachment is located at the distal end of the kinematic chain of the handling device.

For the purposes of the present disclosure, during processing, abrasion or wear and removal regularly occurs. On the one hand, this can lead to dust formation. Therefore, dust extraction is often provided for. Furthermore, wet machining is also known, in which a liquid is applied to bind dust. Nevertheless, it must be regularly assumed that the directly machined area is dirty, so that it is not easy even for an experienced operator to immediately assess whether the existing contact pressure or whether other machining parameters have been or are favorably selected. Also in this context it is envisaged that the compensation arrangement regulates and/or compensates the contact pressure, at least in the operating range, at least in certain embodiments.

According to an exemplary embodiment of the attachment, the compensation arrangement compensates in the operating range for positional changes of the mounting interface of the handling device along the longitudinal axis. The operating range can cover a certain distance, e.g. starting from a neutral position (zero position) a defined distance deviation in both directions. For example, the operating range comprises 250 mm, wherein 125 mm are provided in each case starting from a neutral position for corresponding travel variations in both directions. The task of the compensation arrangement is thus to provide a sufficiently high and as constant as possible contact pressure or a corresponding contact force even in the event of travel fluctuations.

In other words, the compensation arrangement in an exemplary embodiment is arranged to ensure a substantially constant or constant contact pressure in an operating range of about 250 mm. The operating range is, for example, in a range of 250 mm+/−25 mm.

According to another exemplary embodiment of the attachment, compensating movements of at least 200 mm along the longitudinal axis are possible in the operating range of the compensation arrangement. According to a further embodiment, compensating movements of at least 300 mm are possible. According to a further embodiment, compensating movements of at least 400 mm are possible. The values are the sum of the variations in both directions, starting from the neutral position.

The operator aligns the handling device so that the attachment is in the neutral position of the compensation arrangement, in certain embodiments. If machining is started in this position, sufficient compensation space is available for possible compensation movements. The court is to provide a contact pressure that is as constant as possible.

According to a further exemplary embodiment of the attachment, the compensation arrangement can be operated in a first operating mode and at least one second operating mode, wherein the first operating mode takes into account (or is configured for) a vertical orientation of the longitudinal axis and the at least one second operating mode considering (or being configured for) a horizontal orientation of the longitudinal axis. In a further operating mode, a horizontal orientation of the longitudinal axis may also be present, wherein the attachment is pivoted by 180°. The further (second) operating mode is respectively configured. In this way, a right wall or a left wall can be machined.

It should be noted in this context that in the vertical orientation for machining ceilings the own weight acts in a different way than in horizontal orientation for machining side walls. This must be taken into account accordingly when providing the desired contact pressure. It is therefore not only a matter of swiveling the attachment. At least the compensation arrangement should then be adapted to the present orientation, for example by selecting an appropriate operating mode. A conceivable target value for the contact pressure and/or contact force can be around 750-1.800 N (Newton), regardless of the orientation.

According to another exemplary embodiment of the attachment, the compensation arrangement is controlled in such a way that an essentially constant contact pressure is available in the operating range. This applies for instance to normal applications without conscious or unconscious incorrect operation. According to one exemplary embodiment, a resulting contact pressure in the operating range varies by a maximum of 15%. According to another exemplary embodiment, the resulting contact pressure in the operating range varies by a maximum of 10%. According to another exemplary embodiment, the resulting contact pressure in the operating range varies by a maximum of 5%. In other words, the compensation arrangement can provide a sufficiently constant contact pressure even with significant compensating movements.

If a defined contact pressure is referred to in the context of the present disclosure, this may also involve a defined tolerance range and/or range of fluctuation. It is to be understood in the context of the application that it is not a matter of absolute accuracy, but of enabling a constant work result without major fluctuations.

In accordance with a further exemplary embodiment of the attachment, the compensation arrangement comprises at least one working cylinder extending in the longitudinal direction, wherein the working cylinder is arranged to be connected to a pressure medium supply of the handling device, and wherein the regulation of an actual pressure in the working cylinder at a present supply pressure is effected by a pressure regulation, which is provided in the attachment itself. In the event of travel fluctuations, which have a corresponding effect on the position of the working cylinder, the integrated pressure control ensures that the desired pressure level and/or the force level is maintained at the processing head. For example, the working cylinder extends between a proximal end and a distal end of the compensation arrangement.

It is not necessary to outsource this control to the handling device. Instead, it is sufficient for the handling device to provide a certain input pressure, wherein pressure fluctuations in the applied system pressure (supply pressure) are levelled out in the attachment by suitable components (pressure reducers or similar).

Furthermore, the operator is relieved of the task of checking and, if necessary, readjusting the pressure. A pressure control on the attachment ensures that, regardless of the current position of the working cylinder, the same pressure level is applied, as far as possible, at least in the operating range, in order to provide the desired contact pressure. In other words, it is also not necessary to constantly re-align the handling device to compensate for any travel fluctuations in the longitudinal direction. This might be necessary if existing fluctuations or deviations are greater than the present operating range.

In accordance with another exemplary embodiment of the attachment, the compensation arrangement further comprises a longitudinal guide for the processing head, which guides a movement of the processing head in the longitudinal direction independently of a current orientation of the attachment. As an example, the longitudinal guide is arranged as a roller guide. The guide is arranged for low friction. If a separate guide is provided, the guiding task is not or not only the task of the working cylinder. Any (lateral)

guides acting on the working cylinder can be minimized. The longitudinal guide provides positive guidance in the longitudinal direction. In certain embodiments, the longitudinal guide is arranged as a closed guide, so that the guiding function is ensured regardless of the current orientation of the attachment.

In accordance with another exemplary embodiment of the attachment, the longitudinal guide comprises a guide frame, in which a profile carriage, which can be moved relative to the guide frame, is accommodated, which is supported on the guide frame, with the processing head being accommodated at one end of the profile carriage.

In other words, one of the two guide parts that are movable relative to each other is coupled to the processing head. The other guide part is coupled to the mounting unit. This enables movement along the longitudinal axis between the processing head and the mounting unit. For example, the working cylinder comprises a cylinder housing and a piston rod accommodated in the cylinder housing. For example, the piston rod is coupled to the processing head. Accordingly, the cylinder housing is coupled to the mounting unit. However, a reverse assignment is also conceivable. The compensation arrangement can also be referred to as a telescopic guide or telescopic compensation arrangement.

By way of example, the guide comprises a carriage profile and/or a carriage, which is roller-guided and/or roller-bearing mounted. A conceivable embodiment of the longitudinal guide includes guideways on the longitudinal edges of the slide profile, wherein the rolling elements or rollers are provided with corresponding V-grooves or U-grooves that contact the edges of the slide profile. Accordingly, the slide profile can comprise four edges around its circumference, on which corresponding rolling elements or rollers are arranged. This ensures the guidance function regardless of the current orientation of the attachment.

According to another exemplary embodiment of the attachment, the compensation arrangement also comprises a visual indicator for visualization of a current working position of the processing head in the operating range. The visual indicator is attached to the attachment in such a way that it is clearly visible to the operator. It may simply be a pointer to which a scale is assigned, for example, to represent the operating range. By way of example, the attachment comprises corresponding pointers on two or more sides so that the indicator can be seen regardless of the current orientation of the attachment.

This measure may have the further effect that no exchange of information with the handling device is necessary to provide the operator with the information. For example, the scale can contain qualitative information, such as color coding, in addition to quantitative information (such as the length and subdivision of the work range). For example, the color green can indicate a central area of the scale where the neutral position is located. Towards the two edges of the scale, for example, the color can change via yellow to red. If the pointer is in the red area, this will cause the operator to reposition the handling device or otherwise act on the handling device and/or attachment.

Conversely, the indicator can provide feedback to the operator that the wall or ceiling is being machined correctly, and that the contact pressure is within the required range.

According to another exemplary embodiment of the attachment, the processing head is connected to one end of the compensation arrangement via a joint arrangement. As an example, at least one biasing element is provided to urge the processing head towards a target orientation. The joint arrangement ensures that the processing head is aligned as parallel as possible to the surface to be processed. The joint arrangement is located at the distal end of the compensation arrangement.

The alignment of the processing head is effected by the contact force and/or the contact pressure. Nevertheless, biasing elements, such as springs in the form of tension springs, can help to ensure that the processing head is favorably positioned in relation to the longitudinal axis even if there is no contact with the section to be processed.

According to another exemplary embodiment of the attachment, the joint arrangement is arranged as a gimbal joint arrangement providing two swivel axes, which are oriented perpendicular to each other and perpendicular to the longitudinal axis. In an exemplary embodiment, the two swivel axes intersect, with the longitudinal axis also intersecting the swivel axes. The gimbal-mounted suspension of the attachment enables necessary compensating movements to be carried out easily to ensure the desired parallel support of the processing head, if required.

In regard of the mobile handling device or mobile work machine, the above and other objects are achieved by a mobile handling device, for instance a mobile work machine, which comprises the following:
an undercarriage comprising a travel drive;
a body that supports a controllable boom;
a mounting interface at an end of the boom;
a pressure medium supply unit;
a control device; and
an attachment for processing walls or ceilings, comprising:
  a mounting unit,
  a processing head that is arranged to be equipped with at least one tool for material-removing processing or smoothing processing, and
  a compensation arrangement that is arranged between the mounting unit and the processing head and that defines a longitudinal axis,
wherein the attachment is mounted to the boom, with the mounting unit being mounted to the mounting interface,
wherein the mounting unit provides at least two pivot positions for the attachment that are offset from one another,
wherein the processing head is movable relative to the mounting unit in a longitudinal direction along the longitudinal axis,
wherein the control device is configured to control the mobile handling device to guide the attachment in a defined orientation relative to a wall or ceiling and to position the mounting interface at a defined distance range from the wall or ceiling during a feed movement of the attachment along the wall or ceiling that is controlled by operator commands,
wherein the compensation arrangement is supplied with a pressure medium via the pressure medium supply unit, and
wherein the compensation arrangement is configured to provide a defined contact pressure force for the processing head in a defined operating range along the longitudinal axis towards the surface to be processed, with the attachment being supported by the handling device.

By way of example, the handling device is arranged as a mobile work machine, such as a mobile construction machine. By way of example, the handling device is arranged as a remote-controlled or remotely operated mobile work machine with its own travel drive. Such a device is basically similar in design to a hydraulic excavator, but no control stand or driver's cab is provided directly at the device. Instead, it is operated via a separate operating unit, which is connected to the device either by cable or wirelessly. The drive is regularly electro-hydraulic, although other types of drive are conceivable. Due to their compactness and the absence of combustion engines, such machines can also be used inside buildings.

The handling device is therefore not only used to hold and position the attachment. The handling device also provides a counterforce or holding force to support the contact pressure applied by the compensation arrangement. If possible, the handling device can be positioned with the attachment and the extension boom in a highly rigid and unyielding manner so that a high holding force is available. However, practice shows that a certain amount of play or compliance is/are regularly present.

For this reason, the handling device alone cannot ensure the desired constancy of the contact pressure. Accordingly, in certain embodiments, it is possible to provide a kind of "buffer" with the compensation arrangement, which is interposed between the processing head and the handling device.

The undercarriage includes chains or wheels. The pressure medium supply unit includes, for example, an integrated pump. Alternatively or additionally, the pressure medium supply unit can be equipped with a corresponding pressure reservoir. Via corresponding connections for attachments, the same can be supplied with an appropriate pressure medium (hydraulic oil).

The body may also be referred to as superstructure. In an exemplary embodiment, the body can be rotated about a vertically oriented axis relative to the undercarriage. Usually the boom comprises a number of swivel arms arranged in a series to form a kinematic chain (open kinematic chain). Accordingly, the structure with the boom is similar to a jointed-arm robot or articulated robot. Compared to a jointed-arm robot, however, at least in some exemplary embodiments there is the limitation that primarily horizontally oriented swivel axes are provided between the swivel arms, which are oriented parallel to each other. However, this is not to be understood to be limiting.

According to another exemplary embodiment of the handling device, the body can be rotated relative to the undercarriage, wherein the boom comprises a first arm section, a second arm section and a third arm section, which form an open chain and are pivotable relative to each other, wherein the first arm section is pivotably mounted on the body, wherein the third arm section supports the mounting interface, which is pivotably accommodated on the third arm section, wherein the pivot axes of the arm sections of the boom are each oriented parallel to one another and perpendicularly to the axis of rotation of the body relative to the undercarriage, and wherein the pivot axes are associated with drives, which are controllable via the control device. The drives are for example corresponding cylinders. It goes without saying that, if required, devices for position determination and position monitoring are also provided.

According to another exemplary embodiment of the handling device, the mounting interface is arranged to be swiveled about a swivel axis to provide for parallel orientation of the processing head with respect to the wall or ceiling. This swiveling movement can take place relative to the third arm section. Thus, the desired orientation parallel to the surface to be processed can be provided irrespective of a current position/orientation of the arm. By way of example, the control device is arranged to ensure a horizontal orientation of the processing head in a horizontal mode by swivel movements around the (horizontal) swivel axis relative to the third arm section. An example is then the longitudinal axis of the attachment perpendicular to it, i.e. vertically oriented. By way of example, this mode is suitable for machining ceilings.

In accordance with a further exemplary embodiment of the handling device, the control device can be operated at least in a horizontal mode or a vertical mode, wherein the control device controls the drives of the handling device in the horizontal mode in such a way that the attachment is moved (can be moved) along a horizontal path, and the control device controlling the drives of the handling direction in the vertical mode in such a way that the attachment is moved (can be moved) along a horizontal path.

According to another exemplary embodiment, the control device is further arranged to permit movements of the attachment in a horizontal plane in the horizontal mode. In the alternative or in addition, the control device is arranged to permit movements of the attachment in a vertical plane in the vertical mode.

A potential goal of these embodiments is to simplify the operation of the handling device in the context of the machining task and the typical applications of the attachment. The processing of walls or ceilings is usually carried out in such a way that a meandering line, zigzag line or serpentine line is traveled in order to process the surface completely and in the shortest possible time. In certain embodiments, this should involve a processing that is as even as possible. The dwell time of the processing head in each surface portion should be as equal as possible.

A handling device that is arranged in accordance with the embodiments described hereinabove basically provides a higher number of degrees of freedom for movement than would be required for the desired machining of flat surfaces with the processing head oriented as parallel as possible to the surface.

In accordance with the above embodiment, the control device of the handling device is operated in such a way that as a result some degrees of freedom are blocked. In other words, a reduced number of degrees of freedom is "simulated", which allows movement in the desired planes, but no deviations therefrom. If possible, once the operator has brought the attachment with the processing head into the desired starting position (parallel alignment and contact of the processing head with the surface), he can only move the attachment in two dimensions, i.e. within the desired processing plane. The control device converts corresponding control commands into movements of the links of the kinematic chain. A movement along a plane thus requires the use of a plurality of movement axes, which interact in such a way that a supposedly simple movement takes place in the desired plane.

In certain embodiments, this is of certain relevance for the above described arrangement of a handling device comprising a boom with several arm sections and horizontally extending swivel axes between the arm sections, especially for the machining of ceilings along planes that are extending substantially horizontally. If the control device can now be operated in such a way that the current height position (vertical position) and the current alignment of the attachment can be "locked" in terms of control, further operation with regard to the feed along the desired path of movement of the attachment is considerably simplified.

In certain embodiments, in the horizontal mode and/or vertical mode, "virtual" planes are thus defined, in which the processing head can be moved with the desired orientation by simple operator commands. The operator can easily use "virtual" axes or directions such as up/down and right/left for machining side walls and/or right/left and forward/backward for machining ceilings. The input can easily be made on an operating unit, for example by using a joystick. The conversion into corresponding movements of the links of the kinematic chain of the handling device is done by the control device.

In certain embodiments, these measures may also help to keep the contact pressure within the desired target range. If the operator had to manually control the handling device along all available axes, this would result in considerable fluctuations of the contact pressure.

According to another aspect, the present disclosure also relates to the use of an attachment according to one of the exemplary embodiments described herein with a handling device for material-removing processing or smoothing processing walls or ceilings, wherein the handling device is for instance arranged as a remotely controllable mobile work machine, and wherein the attachment can be operated independently of control commands by the handling device and can be moved along a surface to be processed. In other words, there is no exchange of information between the attachment and the handling device during operation, at least in exemplary embodiments. The handling device holds and positions the attachment. Furthermore, the handling device provides a pressure medium, which is used, for example, to control a working cylinder of the compensation arrangement of the attachment. Beyond that, however, there are no control interventions or regulating interventions in the operation of the compensation arrangement on the part of the handling device, at least in certain embodiments.

For example, the attachment itself does not require any direct control commands from the operator after activation during operation, in certain embodiments. In this way, the attachment can be operated self-sufficient, in terms of control. The attachment is not operated self-sufficiently in terms of energy, as the energy supply is provided by the handling device. This may involve electrical or fluidic energy. By way of example, the drive of the processing head can include an electric motor or a fluidic drive.

In accordance with yet another aspect, the present disclosure also relates to a method for operating a mobile handling device, for instance a mobile work machine, for the material-removing processing or smoothing processing of wall surfaces or ceiling surfaces, wherein the handling device is arranged in accordance with at least one of the exemplary embodiments described herein and supports an attachment in accordance with at least one of the exemplary embodiments described herein.

The operation of the handling device may, as already explained above, involve an operation of the control device in a vertical mode or a horizontal mode, so that permitted movement planes for the attachment are provided. This may significantly reduce the operator's workload, as he is, so to say, only offered those degrees of freedom that are actually required for the current machining operation.

Accordingly, in certain embodiments, certain degrees of freedom of movement of the handling device are blocked in the vertical mode or the horizontal mode, respectively. Other degrees of freedom of movement that match the current operation mode are enabled. As a consequence, a certain enabled movement range is available and offered to the user. As a result, operating errors may be avoided, at least to a certain extent.

It is to be understood that the above-mentioned features of the invention and those to be explained in the following can be applied not only in the respectively specified combination, but also in other combinations or singly, without departing from the scope of the present invention.

BRIEF DESCRIPTION OF THE DRAWINGS

Further features and advantages of the invention are disclosed by the following description of a plurality of exemplary embodiments, with reference to the drawings, wherein.

EMBODIMENTS

Figure 1:
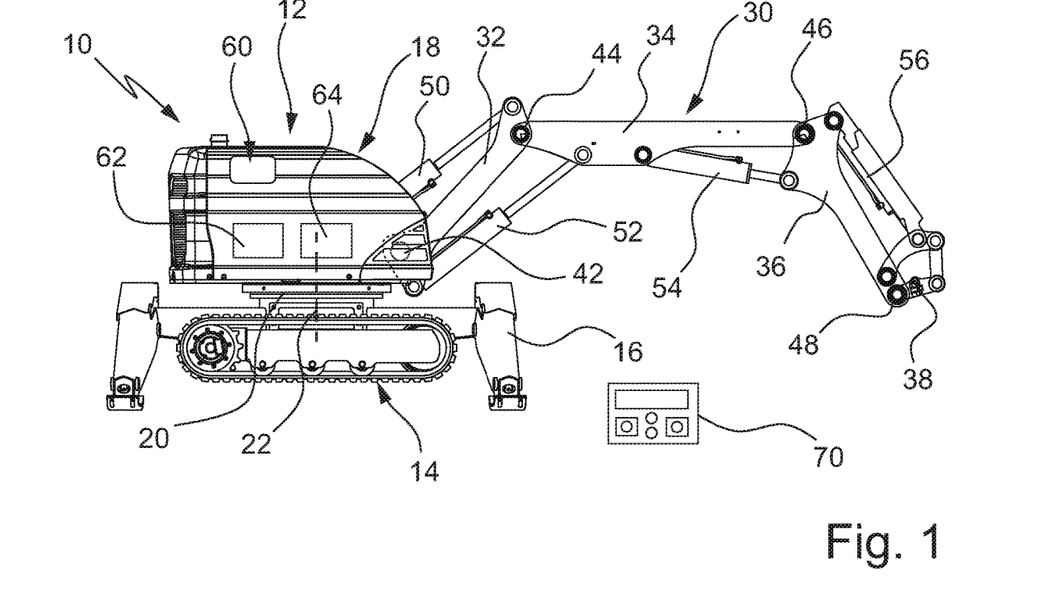
FIG. 1 is a side view of an exemplary embodiment of a handling device, which is arranged as a mobile work machine.

FIG. 1 elucidates with reference to a side view an exemplary embodiment of a handling device, which is overall designated by 10. In the exemplary embodiment according to FIG. 1, the handling device 10 is arranged as a mobile work machine 12.

The handling device 10 comprises an undercarriage 14, which in the exemplary embodiment according to FIG. 1 is arranged as a crawler undercarriage or tracked undercarriage. It goes without saying that the undercarriage 14 may also comprise wheels. Furthermore, the handling device 10 comprises supports designated by 16, which can be extended during use of the handling device 10. In other words, the handling device 10 can be jacked up if necessary.

The undercarriage 14 also carries a body 18, which can be rotated, for example, in relation to the undercarriage 14 and/or the supports 16. The body 18 may also be referred to as superstructure. For this purpose, for example, a rotating assembly or slewing ring 20 is provided between the undercarriage 14 and the body 18, which defines a vertically oriented rotation axis 22 for the body 18. A suitable rotary drive is assigned to the slewing ring 20.

The body 18 carries a boom 30, which is arranged as an articulated boom. The boom 30 comprises arm sections 32, 34, 36. The arm section 32 is mounted on the body 18. The arm section 34 is arranged between the arm sections 32, 36. The arm section 36 is arranged facing away and/or remote from the body 18. The arm section 32 may also be referred to as proximal arm section 32. The arm section 36 may also be referred to as distal arm section 36. The arm section 36 carries a device interface or mounting interface 38. Attachments can be picked up at the mounting interface 38.

The arm section 32 is pivotably mounted to the body 18 via a pivot axis 42. The arm section 34 is pivotably mounted on the arm section 32 via a pivot axis 44. The arm section 36 is pivotably mounted on the arm section 34 via a swivel axis 46. The mounting interface 38 is mounted pivotally on the arm section 36 via a pivot axis 48. Departing from the undercarriage 14, the body 18, the arm sections 32, 34, 36 and the mounting interface 38 form a linear, open kinematic chain. The axes 42, 44, 46 and 48 are parallel to each other and each oriented perpendicular to the axis 22.

A cylinder 50 is provided to move the arm section 32 relative to the body 18. A cylinder 52 is provided for moving the arm section 34 relative to the arm section 32. A cylinder 54 is provided to move the arm section 36 relative to the arm section 34. A cylinder 56 is provided for moving the mounting interface 38 relative to the arm section 36.

In FIG. 1, a control device of the handling device 10 is indicated by 60. The control device 60 controls the operation of the handling device 10. Furthermore, a drive unit indicated by 62 is provided, especially an electro-hydraulic drive unit. Further, a pressure medium supply unit 64 is provided. The pressure medium supply unit 64 comprises at least one pump or a pressure reservoir for providing a pressure medium. The pressure medium is a suitable fluid, such as hydraulic oil.

Further, FIG. 1 shows an operating unit 70, which in the exemplary embodiment is a remote control. The operating unit 70 is connected by cable or without cable to the control device 60 of the handling device 10. Via the operating unit 70, an operator can control the handling device 10. In accordance with the exemplary embodiment according to FIG. 1, no operator's console, control stand or similar is provided directly on the body 18. The remote operability of the handling device 10 may have the effect that the operator can control the handling device 10 from a safe distance. In addition, the operator can position himself freely to obtain a good overview of the current application of the handling device 10.

Figure 2:
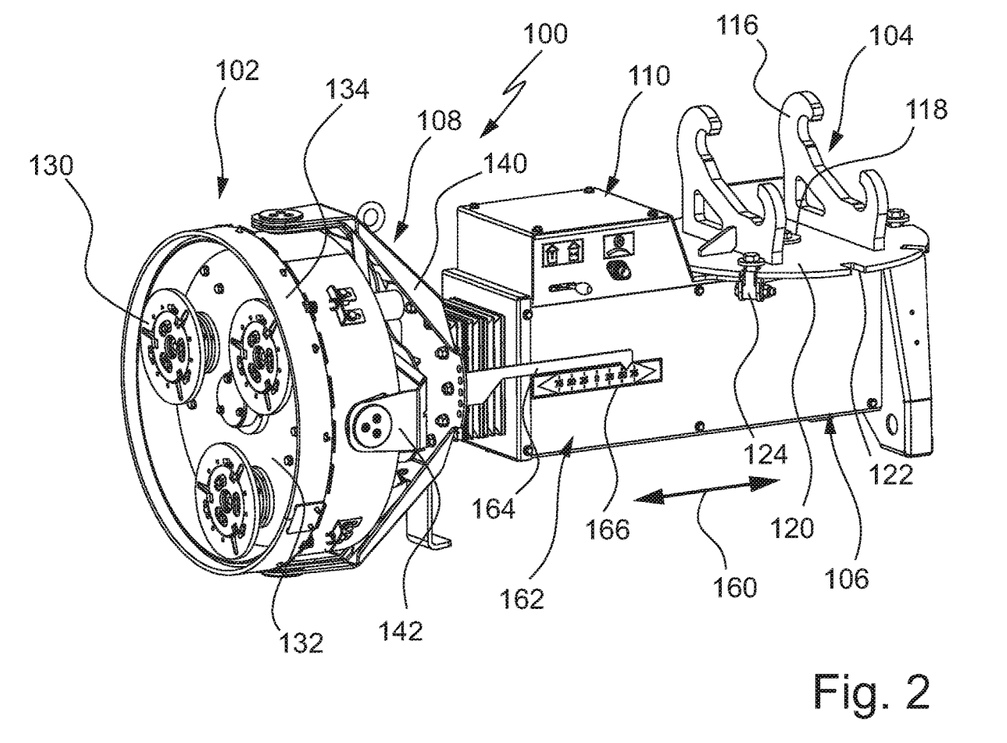
FIG. 2 is a perspective view of an embodiment of an attachment.
Figure 3:
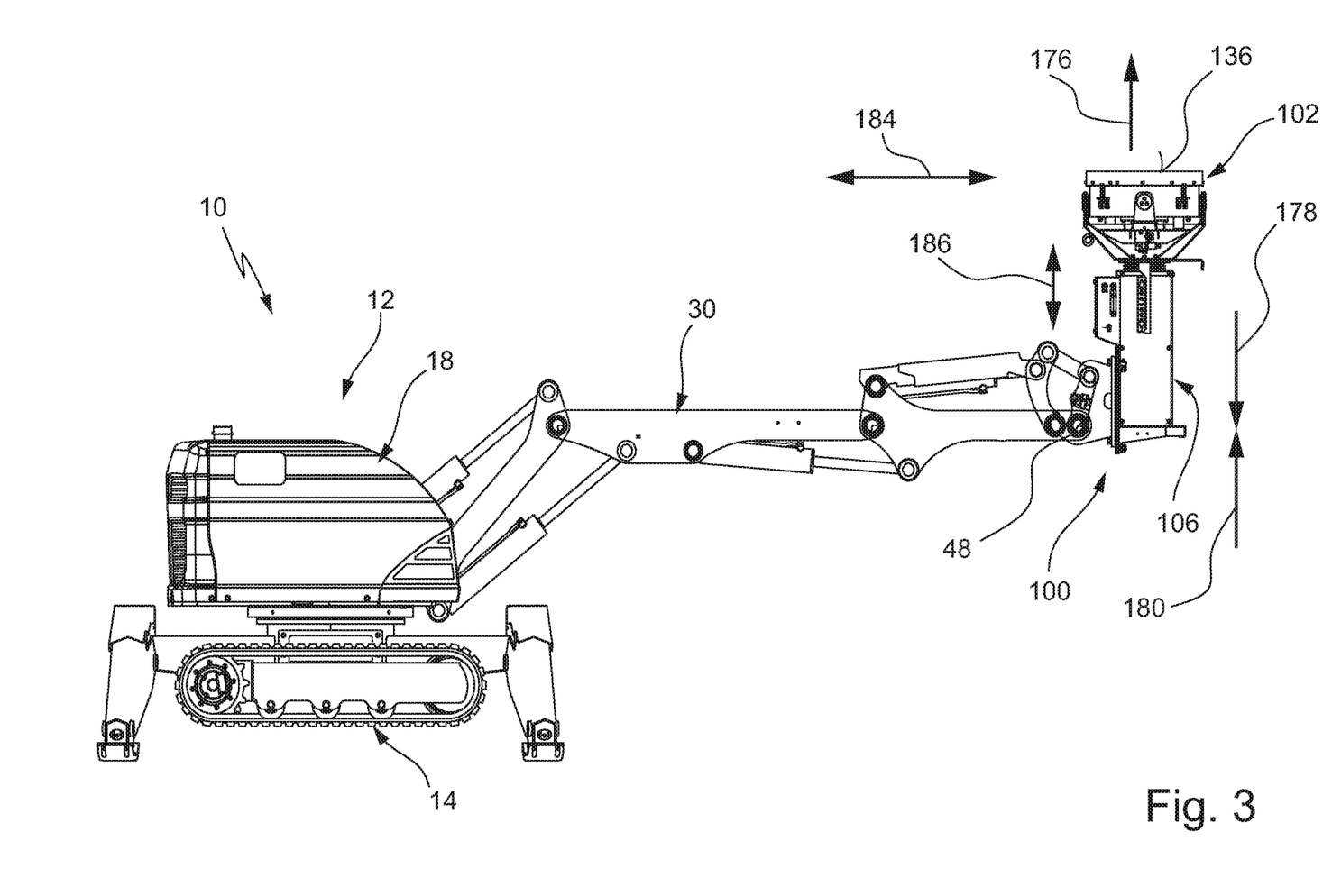
FIG. 3 is a side view of a handling device according to FIG. 1, which is equipped with an attachment according to FIG. 2, in a configuration for processing ceilings.

With reference to FIG. 2 and with supplementary reference to FIG. 3, an attachment designated by 100 for the handling device 10 is illustrated and explained in more detail.

The attachment 100 is arranged as a device for removing processing or smoothing processing walls or ceilings. The processing may include grinding, milling, polishing, bush hammering and/or smoothing. As stated above, the term wall can include both side walls with a substantially vertical extension and ceiling walls with a substantially horizontal extension.

The attachment 100 includes a processing head 102, which may also be referred to as a working head. The processing head 102 is formed at a distal end of the attachment 100. A mounting unit 104 is provided at a proximal end of the attachment 100 and facing away therefrom. The mounting unit 104 is arranged for supporting the attachment at the mounting interface 38 of the handling device 10, see FIG. 1 and FIG. 3.

A compensation arrangement 106 is arranged between the mounting unit 104 and the processing head 102. At least in accordance with the exemplary embodiment shown in FIG. 2, the processing head 102 is connected to the compensation arrangement 106 via a joint arrangement 108. The joint arrangement 108 can also be described as gimbal suspension. Furthermore, a control unit designated by 110 is provided, which is arranged as a component of the attachment 100.

As already mentioned above, at least some of the embodiments are arranged for providing as few interfaces as possible or no interfaces for the exchange of information and/or control commands between the handling device 10 and the attachment 100. This increases flexibility, the attachment 100 can be used with different handling devices 10 without the need for complex conversions and the like.

With reference to FIG. 2 and with supplementary reference to FIGS. 3-8, components and functions of the attachment 100 are explained in more detail.

The mounting unit 104 comprises a support 116, which is adapted to the mounting interface 38 of the handling device 10. The support 116 allows the attachment device 100 to be hooked onto the mounting interface 38. Furthermore, the mounting unit 104 comprises a pivot bearing 118, which forms a rotation center for a disc 120, which carries the support(s) 116.

Figure 4:
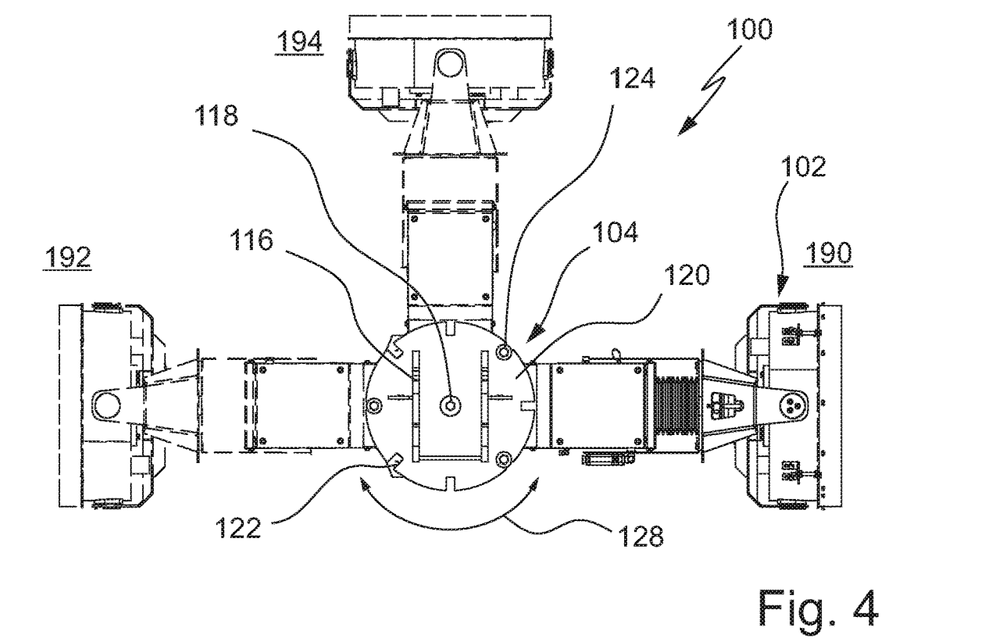
FIG. 4 is an arrangement of an attachment from the point of view of a mounting interface of a handling device, wherein different orientations of the attachment are indicated.

The disc 120 comprises circumferentially distributed detent recesses 122, which define a division of the disc 120. Furthermore, the attachment 100 is equipped with retaining elements 124, which engage the detent recesses 122 in order to define a current rotational position of the disc 120 relative to the attachment 100. The pivot bearing 118 provides a pivot axis 126 for the support 116 together with the disc 120. In this connection, FIG. 4 illustrates swivel movements between the disc 120 with the support 116 and the attachment 100 by means of a curved double arrow 128, by way of example.

The processing head 102 is provided with at least one tool holder 130, which can be equipped with a tool. In the exemplary embodiment according to FIG. 2, three plate-shaped tool holders 130 are provided, which are arranged within a ring. It goes without saying that otherwise designed processing heads may comprise only a single tool holder 130 or several tool holders 130. A drive 132 is provided for driving the tools, which are accommodated on at least one tool holder 130, which is arranged as a hydraulic drive or as an electric motor drive. Furthermore, by way of example, a dust extraction system 134 is provided to reduce the dust development during machining.

Depending on the application, the attachment 100 can be used for dry processing or wet processing by adding a liquid to bind dust. Accordingly, a fluid supply can be provided in addition or as an alternative to the dust extraction system 134, which, for example, supplies water to the machining point.

Figure 6:
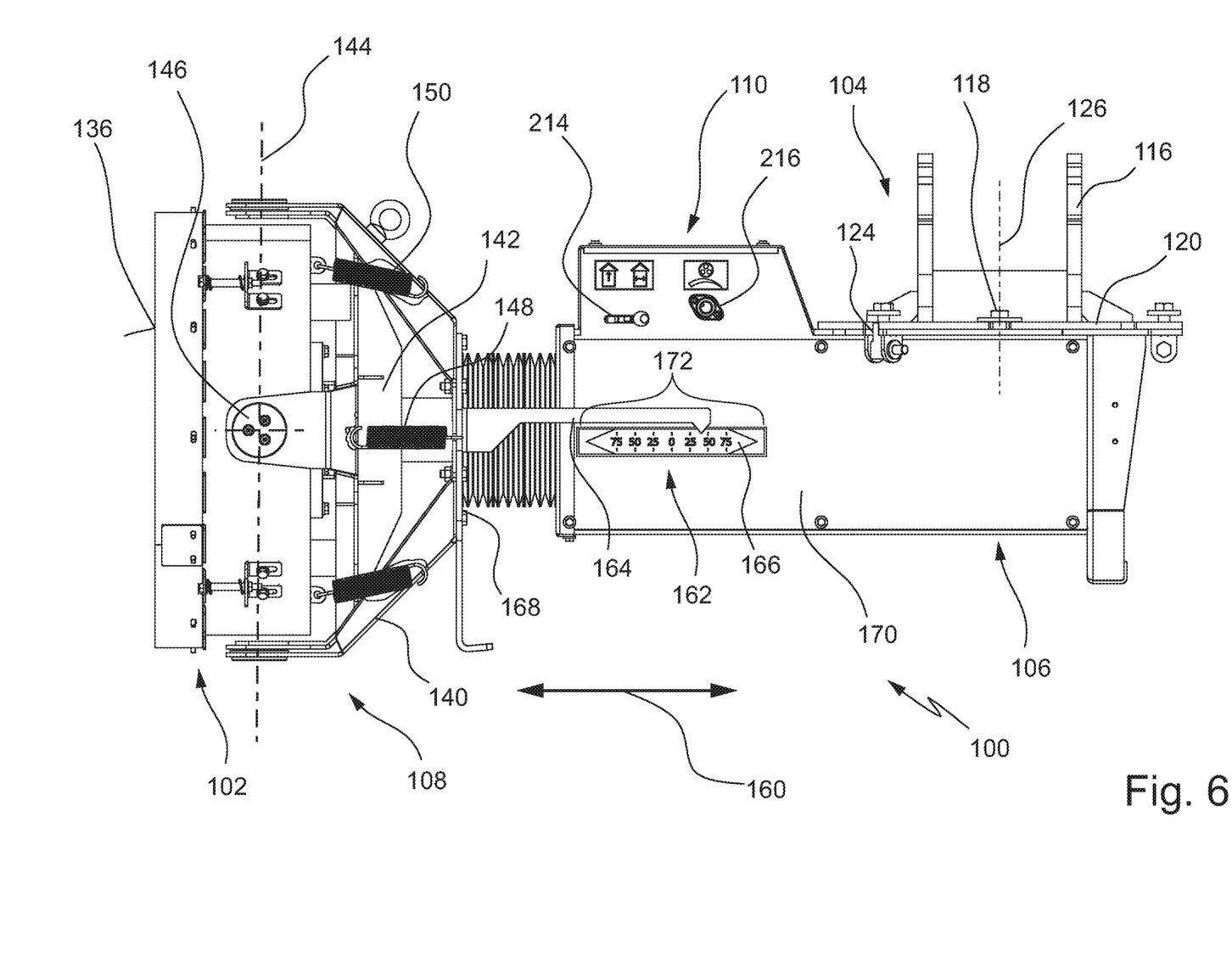
FIG. 6 is a side view of the attachment according to FIG. 2.

In FIG. 3 as well as in FIG. 6 a working plane is indicated by 136. When using the attachment 100 for machining surfaces, the working plane 136 is aligned as parallel as possible to the corresponding working surface.

The design of the joint arrangement 108 is explained in more detail with reference to FIGS. 2, 6, 7 and 8. The joint arrangement 108 comprises a first support bracket 140 and a second support bracket 142. The first support bracket 140 provides a swivel axis 144 for the second support bracket 142, see FIG. 6 and FIG. 8. The second support bracket 142 is swivel-mounted on the first support bracket 140. The second support bracket 142 provides a swivel axis 146 for the processing head 102. The machine head 102 is swivel-mounted on the second support bracket 142.

The swivel axes 144, 146 of the support brackets 140, 142 are perpendicular to each other. In the exemplary embodiment shown in FIG. 6, the two swivel axes intersect. The support brackets 140, 142 provide for a gimbal suspension of the processing head 102. This enables compensating movements so that the working plane 136 can be aligned parallel to the machining surface with high accuracy at a present contact pressure.

In FIG. 6 biasing elements 148, 150 are illustrated in the form of springs. The biasing elements 148, 150 urge the processing head 102 in the joint arrangement 108 into a desired position. At least one corresponding biasing element 148 is arranged between the support bracket 140 and the support bracket 142. At least one further biasing element 150 is arranged between the support bracket 142 and the processing head 102. A pairwise, opposite arrangement of the respective biasing elements 148, 150 is possible. The at least one biasing element 148 urges the support bracket 142 into a desired position with respect to the support bracket 140. The at least one biasing element 150 urges the processing head 102 into a desired position with respect to the support bracket 142.

In FIG. 2, a double arrow designated by 160 indicates a longitudinal direction of the attachment 100 and/or the compensation arrangement 106. The compensation arrangement 106 defines a longitudinal axis for a corresponding movement between the processing head 102 and the mounting unit 104. This movement (compensation movements) takes place along the longitudinal axis in the longitudinal direction 160.

A current position of the processing head 102 is indicated by an indicator 162. The indicator 162 comprises a pointer 164 and a scale 166. In the exemplary embodiment shown in FIG. 2, the pointer 164 is arranged on a base plate 168 of the joint arrangement 108. The base plate 168 is a component of the support bracket 140 or is firmly connected thereto. Therefore, when the processing head 102 is extended or retracted in the longitudinal direction 160, the pointer 164 performs the same movement. The scale 166 is exemplarily attached to a housing 170 of the compensation arrangement 106. The scale 166 can contain quantitative information and qualitative information. Qualitative information may include color fields and the like.

The scale 166 illustrates an operating range 172 (FIG. 6), in which the functionality of the attachment 100 is ensured. In the operating range 172 it is ensured that the contact pressure of the processing head 102 is within the desired target range. On the indicator 162 the operator can also read off from a certain distance whether the processing head 102 is in a favorable operating position in relation to the mounting unit 104 and thus to the handling device 10. Especially when the attachment 100 can be operated in different orientations, a plurality of indicators 162 can be provided to facilitate the acquisition of position information.

FIG. 3 illustrates an assembled state of the attachment 100 at the mounting interface 38 of the handling device 10. The handling device 10 is set up in FIG. 3 for ceiling processing. The attachment 100 is mounted in a vertical orientation on the extension boom 30, wherein the working plane 136 of the processing head 102 is arranged parallel to the flat extension of the ceiling. In the state according to FIG. 3, the handling device 10 must not only hold the attachment 10 but also provide additional support so that a contact pressure force 176 can be applied.

When operating the attachment 100, a considerable contact pressure is required, which should be applied as constantly as possible. In FIG. 3 an arrow designated by 176 illustrates the corresponding contact pressure. The contact pressure 176 is applied by the compensation arrangement 106. The compensation arrangement 106 further transmits a counterforce 178, which must be supported or sustained by the boom 30 of the handling device 10. The holding force required for this is designated 180 in FIG. 3.

In FIG. 3 there is indicated a machining path 184, which illustrates a horizontal movement of the processing head 102 along the surface to be processed. During machining, position fluctuations and other disturbance variables inherently occur, which can lead to deviations in the resulting contact pressure 176. The compensation arrangement 106 is configured to ensure that the contact pressure 176 remains as constant as possible, even if compensating movements are required, see the double arrow 186 in FIG. 3. Such compensating movements can be used, for example, to react to position fluctuations or a certain amount of yielding of the boom 30 of the handling device 10. The extent of the compensating movement 186 can be easily read off at the indicator 162.

The pivoting of the mounting interface 38 about the pivot axis 48 allows the desired orientation of the attachment 100 in relation to the surface to be worked on (e.g. wall or ceiling) to be achieved and maintained. This can be done independently of the actual orientation of the arm section 36 (FIG. 1) in relation to this surface. In this way it can be ensured that the processing head 102 is aligned as parallel as possible to the respective surface. This also applies when the attachment 100 is moved along the surface to be machined via the boom 30 of the handling device 10.

FIG. 4 illustrates various conceivable orientations for the attachment 100 from the point of view of the mounting interface 38 of the handling device 10. In FIG. 4, 190 indicates an orientation for machining a right-hand wall. 192 indicates with reference to a dashed representation an orientation for machining a left-hand wall. 194 indicates an orientation for machining a wall on the ceiling side. The curved double arrow 128 in FIG. 4 shows that the disc 120 with the support 116 can be rotated around the pivot bearing 118 of the mounting unit 104, wherein the detent recesses 122 define different detent positions for the retaining elements 124. A pitch can be approximately 90° (degrees). It goes without saying that intermediate steps such as approximately 45° steps are also conceivable. Such an orientation is basically conceivable in connection with the machining of inclined walls.

Figure 5:
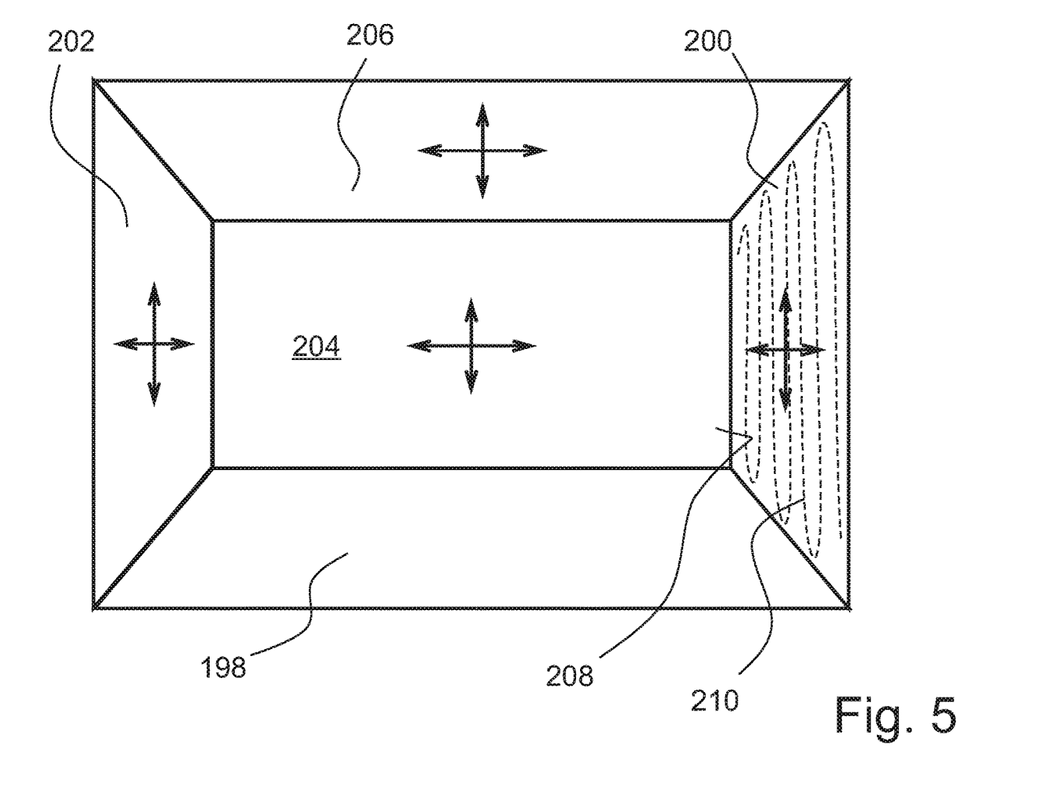
FIG. 5 is a perspective view of a room to illustrate conceivable machining surfaces.

With reference to FIG. 5 as well as with additional reference to FIG. 3 and FIG. 4 different applications for the mounted attachment 100 for surface machining are illustrated. FIG. 5 shows a perspective view of a room with a floor 198, a right wall 200, a left wall 202, a rear wall 204 and a ceiling wall or top wall 206. The attachment 100 is configured to work on the side walls 200, 202, 204. This may require moving the handling device 10 for rough alignment. Furthermore, the attachment 100 can be used to machine the upper wall 206. In principle, it is also possible to work on the bottom 198, but this is not the main application.

For example, the right wall 200 forms a flat surface 208, which should be processed as completely and evenly as possible. A dashed curve indicated by 210 illustrates in a greatly simplified form a possible machining path or a corresponding motion path of attachment 100.

From the point of view of the operator of the handling device 10, which is holding the attachment 100, the actual processing takes place in one plane respectively, so that not necessarily all available degrees of freedom of the handling device 10 have to be used. Furthermore, the attachment 100 should be guided by the handling device 10 as parallel as possible to the respective wall 200, 202, 204, 206. However, at least in the embodiment according to FIGS. 1 and 3, the handling device 10 comprises a kinematics, which is structurally not ideally configured for such movements in one plane. If the operator himself had to provide for a corresponding approximation of the movement, this would result in significantly higher operator effort and ultimately in much greater deviations and fluctuations in the contact pressure.

For this reason the control device 60 of the handling device 10 is arranged, at least according to exemplary embodiments, to be operated in a vertical mode and/or a horizontal mode. In the respective mode, the control device 60 ensures that the desired plane parallel to the wall to be processed is not left, if possible, so that the operating effort for the operator is significantly reduced. If possible, the operator then only has to control a simple movement in a two-dimensional space, compare the machining path 210 in FIG. 5. This significantly reduces pressure fluctuations that occur in the contact pressure. Machining can be carried out with high uniformity and correspondingly good results.

Figure 7:
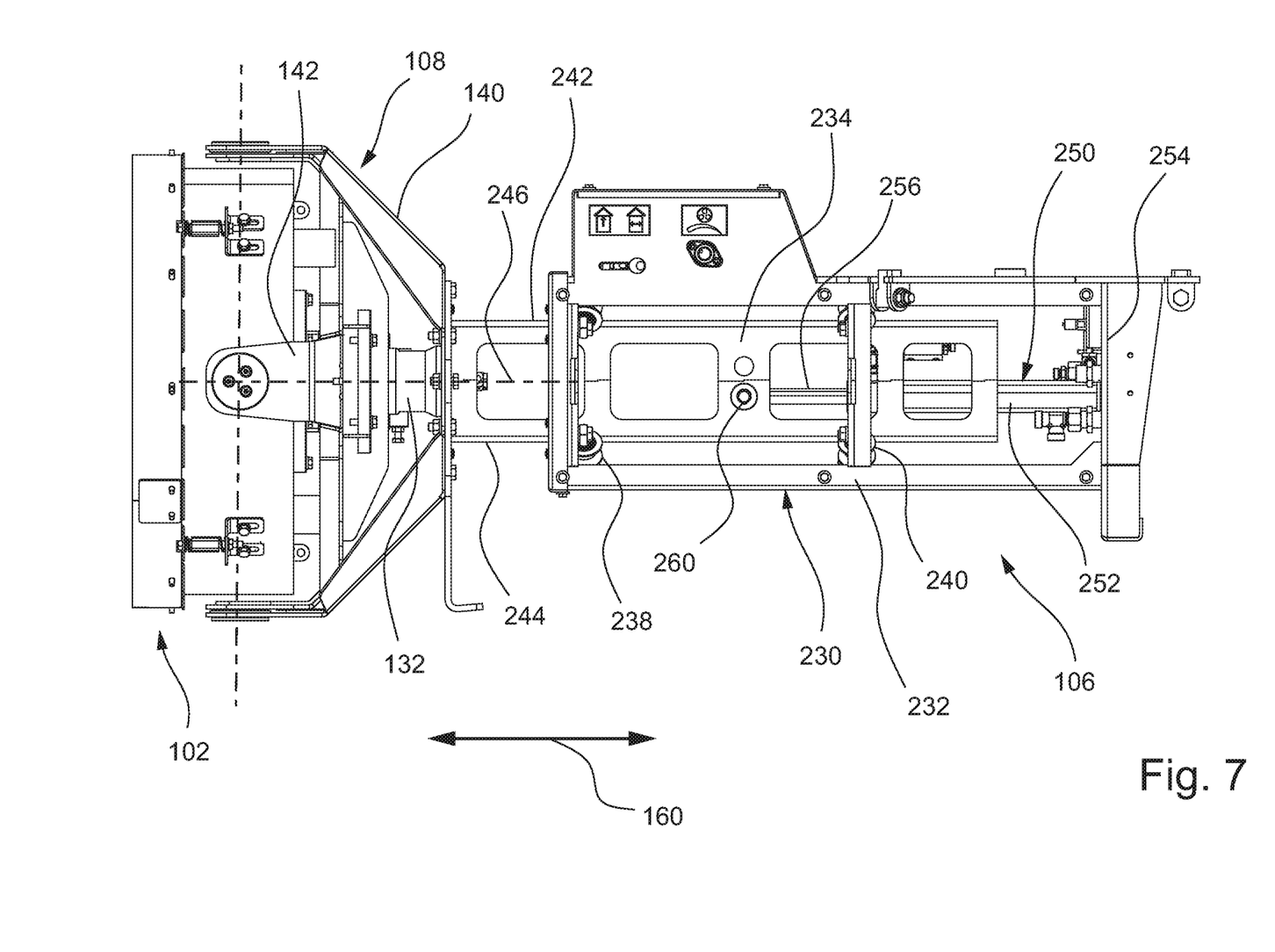
FIG. 7 is another side view of the arrangement as shown in FIG. 6, with components hidden for illustrative purposes.
Figure 8:
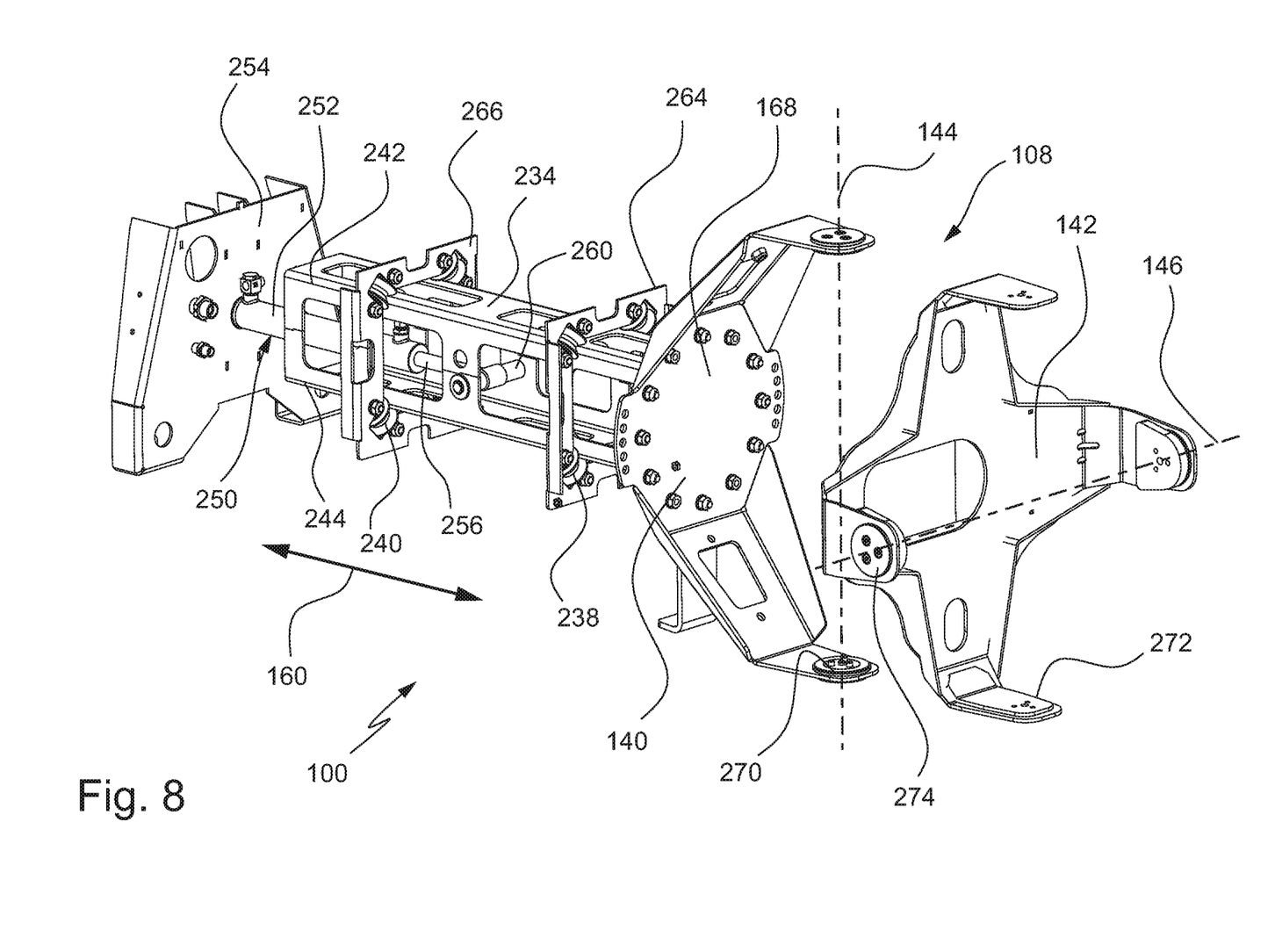
FIG. 8 is a perspective view of the attachment according to FIG. 6 and FIG. 7 in a partially exploded state.

FIG. 6 and FIG. 7 illustrate side views of the attachment 100. FIG. 8 additionally shows a perspective, partially exploded view.

FIG. 6 shows that the control unit 110 of the attachment 100 can comprise different simple operating elements. By way of example, with the selector switch 214 it is possible to switch over between the processing of side walls and the processing of the ceiling. When machining the ceiling, the compensation arrangement 106 must take the dead weight of the attachment 100 into account in a different way than when machining side walls.

Furthermore, 216 indicates a speed controller, which controls a machining speed, such as a rotational speed and/or orbital speed of at least one tool holder 130. The relative speed between the tool and the surface to be processed depends on the type of machining and the material of the wall. In certain embodiments, the control unit 110, at least in exemplary embodiments, is not provided with further operating elements. This further simplifies operation. During operation of the attachment 100 the operator does not have to operate the control elements of the control unit 110.

During operation, indicator 162 provides feedback on the current compensation movement of the compensation unit 106. If possible, pointer 164 is located in a zero position or neutral position of scale 166. This would mean that the desired contact pressure is applied and that no compensation movement is required. Starting from this zero position, compensating movements can be made in the longitudinal direction 160 in order to react, for example, to variations in distance between the mounting interface 38 of the boom 30 of the handling device 10 and the surface to be processed. If only moderate compensation movements are present, the compensation arrangement can keep the contact pressure in the target area. Machining does not have to be interrupted and the uniformity of machining is maintained. Only if excessive compensation movements occur, the operator must interrupt the machining process, for example, to roughly re-align the handling device 10.

The compensation movement is enabled by the compensation arrangement 106. FIG. 7 shows the compensation arrangement 106 in a state, in which the housing 170 is not shown for illustrative purposes. The compensation arrangement 106 comprises a guide 230. The guide 230 comprises a guide frame 232 and a profile carriage 234, which is movably mounted therein. Rollers 238, 240 are arranged between the guide frame 232 and the profile carriage 234, see FIG. 8. The rollers 238, 240 are exemplarily arranged as profile rollers and are adapted to the longitudinal edges of the profile carriage 234 on guideways 242, 244.

The retraction and extraction movement of the profile carriage 234 takes place along a longitudinal axis 246, which also determines the longitudinal direction 160. Along the longitudinal axis 246, compensating movements are possible in order to keep the contact pressure or contact force as constant as possible. The compensation movement or compensation of the contact pressure is carried out by a working cylinder 250, which is also assigned to the compensation arrangement 106. The working cylinder 250 is arranged within the guide 230 and parallel to the longitudinal axis 246. The working cylinder 250 comprises a cylinder housing 252, which is supported on a base plate 254 at the proximal end of the compensation arrangement 106. Furthermore, the working cylinder 250 comprises a piston rod 256 which engages a cross member 260 and thus the profile carriage 234. The cylinder housing 252 is connected to the guide frame 232. The piston rod 256 is connected to the profile carriage 234. Accordingly, the movement of the piston rod 256 relative to the cylinder housing 252 causes a longitudinal movement between the profile carriage 234 and the guide frame 232.

For the working cylinder 250 a pressure control is provided, which is performed by the control unit 110, by way of example. The pressure control is integrated in the attachment and, in certain embodiments, independent of the handling device 10. However, the handling device 10 provides a pressure medium supply.

The perspective illustration in FIG. 8 clearly shows that the guide rollers 238, 240 are mounted on guide walls 264, 266 that are offset from one another. The guide walls 264, 266 are connected to the guide frame 232.

The profile carriage 234 is connected at its distal end to the base plate 168. Accordingly, the first support bracket 140 is firmly attached to the profile carriage 234. FIG. 8 the shows the second support bracket 142 in an exploded, detached state. The swivel axis 144 is provided between the first support bracket 140 and the second support bracket 142. The second support bracket 142 also provides the swivel axis 146 for the processing head 102 (not shown in FIG. 8).

The support bracket 140 comprises lateral support arms 270. The support bracket 142 comprises first support arms 272 and second support arms 274. Support arms 272 are assigned to support arms 270 of support bracket 140. The support arms 274 are used to support the processing head 102. Together, the support arms 270 and 272 form the swivel axis 144. The support arms 274 form the swivel axis 146. Overall, the design of the joint arrangement 108 illustrated herein permits simple alignment and adaptation of the processing head 102 with respect to the surface to be processed. This supports the desired parallel alignment.

What is claimed is:

1. An attachment for a mobile handling device configured to process walls or ceilings, the attachment comprising:
   a mounting unit that is arranged to be supported at a mounting interface of the handling device,
   a processing head that is arranged to be equipped with at least one tool for material-removing processing or smoothing processing, and
   a compensation arrangement that is arranged between the mounting unit and the processing head and that defines a longitudinal axis,
   wherein the mounting unit provides at least two pivot positions for the attachment that are offset from one another,
   wherein the processing head is movable relative to the mounting unit in a longitudinal direction along the longitudinal axis,
   wherein the compensation arrangement is configured to provide a defined contact pressure force for the processing head in a defined operating range along the longitudinal axis towards a surface to be processed,
   wherein the compensation arrangement further comprises a longitudinal guide for the processing head, which guides a movement of the processing head in the longitudinal direction independently of an actual orientation of the attachment, and
wherein the longitudinal guide is arranged as a roller guide.

2. The attachment device of claim 1,
wherein the compensation arrangement is configured for compensating for positional changes of the mounting interface of the handling device along the longitudinal axis in the operating range.

3. The attachment of claim 1,
wherein in the operating range of the compensation arrangement the compensation arrangement is configured to provide compensating movements along the longitudinal axis of at least 200 mm, in terms of absolute value.

4. The attachment of claim 1,
wherein the compensation arrangement is operable in a first operating mode and in a second operating mode,
wherein the first operating mode is adapted to a vertical orientation of the longitudinal axis, and
wherein the second operating mode is adapted to a horizontal orientation of the longitudinal axis.

5. The attachment of claim 1,
wherein the compensation arrangement is controlled in such a way that an effective contact pressure is provided in the operating range, and
wherein the resulting contact pressure in the operating range varies by a maximum of 15%.

6. The attachment of claim 1,
wherein the compensation arrangement comprises at least one working cylinder extending in the longitudinal direction,
wherein the working cylinder is arranged to be connected to a pressure medium supply of the handling device, and
wherein the regulation of an actual pressure in the working cylinder at a present supply pressure is effected by a pressure regulation, which is provided in the attachment itself.

7. The attachment of claim 1,
wherein the longitudinal guide comprises a guide frame, in which a profile carriage is arranged that is movable relative to the guide frame and that is supported on the guide frame, and
wherein the processing head is arranged at one end of the profile carriage.

8. An attachment for a mobile handling device configured to process walls or ceilings, the attachment comprising:
a mounting unit that is arranged to be supported at a mounting interface of the handling device,
a processing head that is arranged to be equipped with at least one tool for material-removing processing or smoothing processing, and
a compensation arrangement that is arranged between the mounting unit and the processing head and that defines a longitudinal axis,
wherein the mounting unit provides at least two pivot positions for the attachment that are offset from one another,
wherein the processing head is movable relative to the mounting unit in a longitudinal direction along the longitudinal axis,
wherein the compensation arrangement is configured to provide a defined contact pressure force for the processing head in a defined operating range along the longitudinal axis towards a surface to be processed, and
wherein the compensation arrangement further comprises a visual indicator configured for visualization of a current working position of the processing head in the operating range.

9. An attachment for a mobile handling device configured to process walls or ceilings, the attachment comprising:
a mounting unit that is arranged to be supported at a mounting interface of the handling device,
a processing head that is arranged to be equipped with at least one tool for material-removing processing or smoothing processing, and
a compensation arrangement that is arranged between the mounting unit and the processing head and that defines a longitudinal axis,
wherein the mounting unit provides at least two pivot positions for the attachment that are offset from one another,
wherein the processing head is movable relative to the mounting unit in a longitudinal direction along the longitudinal axis,
wherein the compensation arrangement is configured to provide a defined contact pressure force for the processing head in a defined operating range along the longitudinal axis towards a surface to be processed,
wherein the processing head is connected to an end of the compensation arrangement via a joint arrangement,
wherein at least one biasing element is provided at the joint arrangement, and
wherein the at least one biasing element is configured to urge the processing head towards a desired orientation.

10. The attachment of claim 9,
wherein the joint arrangement is arranged as a gimbal joint arrangement and provides two pivot axes, which are oriented perpendicular to each other and perpendicular to the longitudinal axis.

* * * * *